US012341807B2

(12) United States Patent
Azaria et al.

(10) Patent No.: US 12,341,807 B2
(45) Date of Patent: Jun. 24, 2025

(54) PACKET FINGERPRINTING FOR ENHANCED DISTRIBUTED DENIAL OF SERVICE PROTECTION

(71) Applicant: Imperva, Inc., San Mateo, CA (US)

(72) Inventors: Jonathan R. Azaria, Beit Gamliel (IL); Avishay Zawoznik, Tel-Aviv (IL)

(73) Assignee: Imperva, Inc., San Mateo, CA (US)

( * ) Notice: Subject to any disclaimer, the term of this patent is extended or adjusted under 35 U.S.C. 154(b) by 416 days.

(21) Appl. No.: 16/718,059

(22) Filed: Dec. 17, 2019

(65) Prior Publication Data

US 2021/0185083 A1    Jun. 17, 2021

(51) Int. Cl.
    *H04L 9/40* (2022.01)
(52) U.S. Cl.
    CPC ...... *H04L 63/1458* (2013.01); *H04L 63/0236* (2013.01); *H04L 63/1416* (2013.01)
(58) Field of Classification Search
    CPC ............. H04L 63/0236; H04L 63/0263; H04L 63/1416; H04L 63/1458
    See application file for complete search history.

(56) References Cited

U.S. PATENT DOCUMENTS

| | | | |
|---|---|---|---|
| 8,689,328 | B2 | 4/2014 | Ormazabal et al. |
| 10,027,694 | B1 * | 7/2018 | Gupta ................. H04L 63/1458 |
| 10,038,715 | B1 * | 7/2018 | Majkowski ......... H04L 63/1458 |
| 11,032,315 | B2 * | 6/2021 | Compton ............ H04L 63/1458 |
| 11,409,871 | B1 * | 8/2022 | Naamneh ............... G06F 21/556 |
| 12,047,392 | B2 * | 7/2024 | Wang .................. H04L 63/1425 |
| 2005/0125195 | A1 * | 6/2005 | Brendel .............. H04L 63/1425 702/182 |
| 2009/0300759 | A1 * | 12/2009 | Wang .................. H04L 63/1458 726/22 |
| 2012/0079592 | A1 * | 3/2012 | Pandrangi ............... H04L 47/10 709/224 |
| 2012/0331556 | A1 * | 12/2012 | Alperovitch ........ H04L 63/1408 726/23 |
| 2015/0033340 | A1 * | 1/2015 | Giokas ................ H04L 63/1433 726/23 |
| 2015/0207815 | A1 * | 7/2015 | Cai ..................... H04L 63/1408 726/22 |
| 2015/0341312 | A1 * | 11/2015 | Ezell ................... H04L 63/1466 726/11 |
| 2016/0006749 | A1 * | 1/2016 | Cohen .................... G06Q 40/12 726/23 |
| 2016/0366160 | A1 * | 12/2016 | Kapoor ............... G06F 16/2358 |

(Continued)

*Primary Examiner* — Daniel B Potratz
*Assistant Examiner* — Matthias Habtegeorgis

(57) ABSTRACT

A method by one or more network devices implementing a scrubbing center for mitigating distributed denial of service attacks, where the scrubbing center is communicatively coupled to a plurality of clients and one or more servers. The method includes determining a set of packet fingerprints seen in a set of packets sent between the plurality of clients and the one or more servers, assigning a risk value to each packet fingerprint in the set of packet fingerprints based on analyzing previous security decisions made for packets having that packet fingerprint, and responsive to detecting an occurrence of a potential distributed denial of service attack, activating a security measure for each of one or more packet fingerprints in the set of packet fingerprints based on the risk value assigned to that packet fingerprint.

17 Claims, 6 Drawing Sheets

(56) References Cited

U.S. PATENT DOCUMENTS

| | | | |
|---|---|---|---|
| 2017/0272475 A1* | 9/2017 | Yu | H04L 65/1096 |
| 2019/0230116 A1* | 7/2019 | Compton | G06N 20/00 |
| 2020/0021609 A1* | 1/2020 | Kuppanna | H04L 63/20 |
| 2020/0045131 A1* | 2/2020 | Nigam | H04L 67/02 |
| 2021/0097179 A1* | 4/2021 | Kovác | G06F 16/285 |
| 2022/0217176 A1* | 7/2022 | Holloway | H04L 63/1458 |

\* cited by examiner

PF PROFILER COMPONENT 140

PF RISK VALUES 145

| PACKET FINGERPRINT | RISK VALUE |
|---|---|
| PARAM_X=A; PARAM_Y=B; AND PARAM_Z=C (PF_ABC) | 5 |
| PARAM_X=D; PARAM_Y=E; AND PARAM_Z=F (PF_DEF) | 2 |
| 10<PARAM_X<100 OR 110<PARAM_X<200 (PF_X_CLUSTERED) | 10 |
| ... | ... |
| UNKNOWN | N/A |

DDOS MITIGATION COMPONENT 160

SECURITY MEASURES 165

| PACKET FINGERPRINT | ACTION(S) |
|---|---|
| PARAM_X=A; PARAM_Y=B; AND PARAM_Z=C (PF_ABC) | N/A |
| PARAM_X=D; PARAM_Y=E; AND PARAM_Z=F (PF_DEF) | WHITELIST |
| 10<PARAM_X<100 OR 110<PARAM_X<200 (PF_X_CLUSTERED) | BLACKLIST |
| ... | ... |
| UNKNOWN | RATE LIMIT |

Figure 2

PACKET FINGERPRINTING FOR ENHANCED DISTRIBUTED DENIAL OF SERVICE PROTECTION

TECHNICAL FIELD

Embodiments of the invention relate to the field of computer network security, and more specifically, to mitigating distributed denial of service (DDoS) attacks using packet fingerprinting.

BACKGROUND ART

A distributed denial or service (DDoS) attack is an attack in which multiple compromised computer systems attack a target (e.g., a server, a website, or other type of computing/network resource) and cause a denial of service for legitimate users of the targeted resource.

One type of DDoS attack commonly referred to as a volumetric attack involves overwhelming the target resource with a large volume of network traffic such that the target is not able to receive legitimate traffic, cannot respond to legitimate traffic, or responds so slowly to legitimate traffic that it becomes effectively unavailable. A few types of volumetric attacks include Internet Control Message Protocol (ICMP) floods, User Datagram Protocol (UDP) floods, and Transmission Control Protocol (TCP) state exhaustion attacks such as TCP SYN floods and idle session attacks.

Another type of DDoS attack commonly referred to as an application layer DDoS attack involves targeting a particular application executing on a computing/network device. Application layer DDoS attacks typically strive to overwhelm network infrastructure and server computing devices by exploiting vulnerabilities or behaviors of well-known application or protocols such as Hypertext Transfer Protocol (HTTP), VoIP, or Simple Mail Transfer Protocol (SMTP).

An existing approach for mitigating DDoS attacks is to identify and block traffic based on variable parameter values such as port, Internet Protocol (IP) address, payload data, and packet anomalies. However, since the parameter values are highly variable, they are easily manipulated by attackers, and thus attackers can mimic legitimate behavior without much effort.

Another existing approach for mitigating DDoS attacks is to identify and block packets based on packet fingerprinting. However, this approach often requires manual labor (e.g., by a security expert) to identify and differentiate between malicious and legitimate packet fingerprints.

BRIEF DESCRIPTION OF THE DRAWINGS

The invention may best be understood by referring to the following description and accompanying drawings that are used to illustrate embodiments of the invention. In the drawings:

FIG. 2 is a diagram illustrating risk values assigned to packet fingerprints and security measures activated for those packet fingerprints based on the risk values, according to some embodiments.

DETAILED DESCRIPTION

Figure 1:
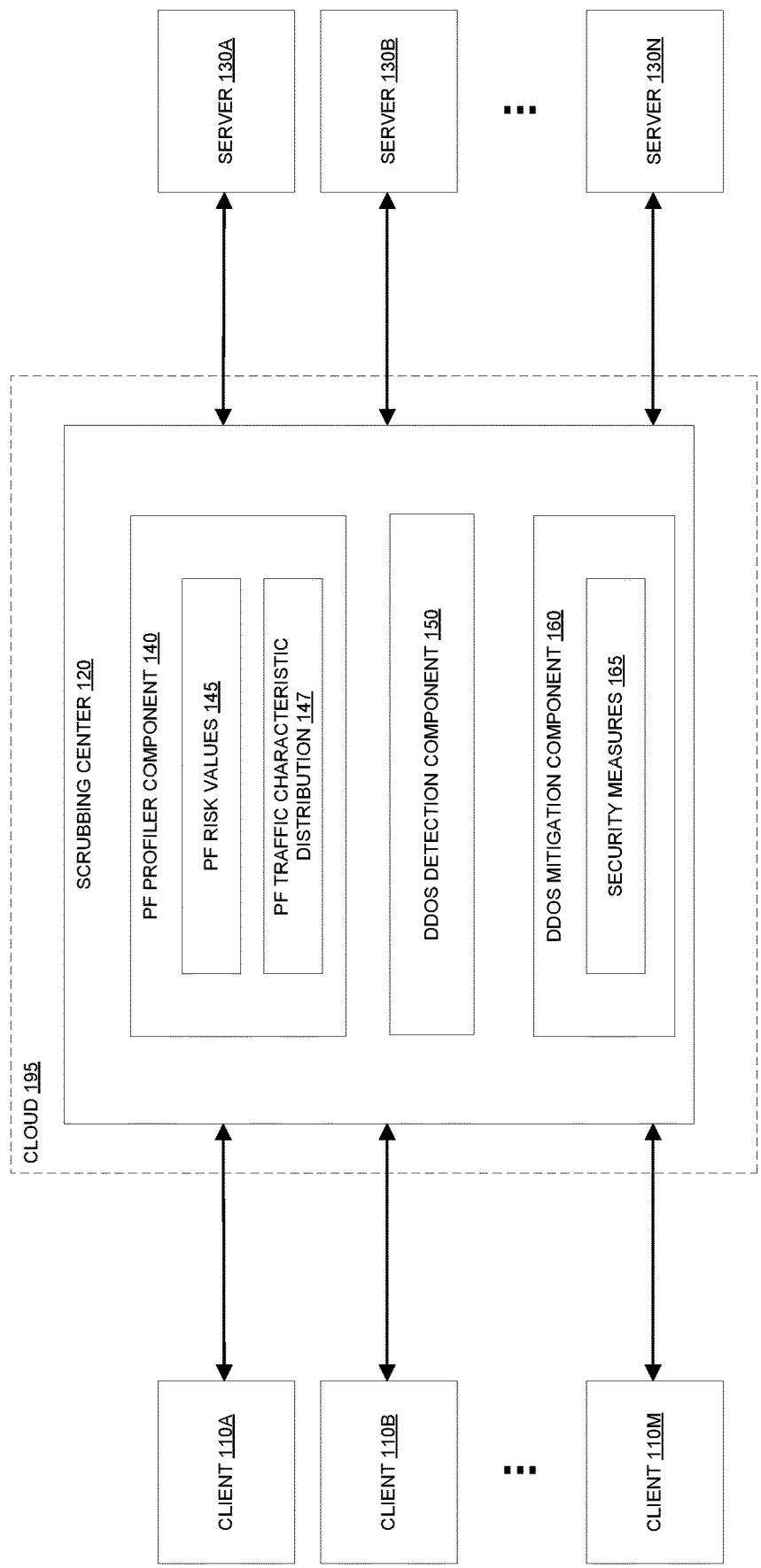
FIG. 1 is a block diagram illustrating a system for mitigating DDoS attacks using packet fingerprinting, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video). Client end stations (e.g., server hardware, workstations, laptops, netbooks, palm tops, mobile phones, smartphones, multimedia phones, Voice Over Internet Protocol (VOIP) phones, user equipment (UE), terminals, portable media players, GPS units, gaming systems, set-top boxes) may execute an HTTP client (e.g., a web browser) to access content and/or services provided over a LAN, over the Internet, and/or over virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public web pages (e.g., free content, store fronts, search services), private web pages (e.g., username/password accessed web pages providing email services), and/or corporate networks over VPNs.

Embodiments disclosed herein provide a mechanism for mitigating distributed denial of service (DDoS) attacks using packet fingerprinting. According to some embodiments, a scrubbing center communicatively coupled to a plurality of clients and one or more servers determines a set of packet fingerprints seen in a set of packets sent between the plurality of clients and the one or more servers, assigns a risk value to each packet fingerprint in the set of packet fingerprints based on analyzing previous security decisions made for packets having that packet fingerprint, and responsive to detecting an occurrence of a potential distributed denial of service attack, activates a security measure for each of one or more packet fingerprints in the set of packet fingerprints based on the risk value assigned to that packet fingerprint. As will become apparent from the present disclosure, embodiments provide, among other advantages, the ability to dynamically identify packet fingerprints based on actual traffic sent between the clients and servers and the ability to dynamically differentiate between malicious and legitimate packet fingerprints without or with minimal manual effort. Various embodiments are further described herein with reference to the accompanying figures.

FIG. 1 is a block diagram illustrating a system for mitigating DDoS attacks using packet fingerprinting, according to some embodiments. As illustrated in the diagram, the system includes clients 110A-M, servers 130A-N, and a scrubbing center 120 communicatively coupled to the clients 110 and the servers 130.

As used herein, a client 110 is an application that can access the content and/or services provided by a server. As used herein, a server 130 is an application that provides content or services upon the request of clients 110. Each of the clients 110 and the servers 130 may be implemented by one or more electronic/network devices. In one embodiment, the client 110 is a web application layer client (e.g., a web browser) and the server 130 is a web application layer server. It should be understood, however, that the DDoS mitigation techniques disclosed herein can be applied to other contexts (e.g., to mitigate DDoS attacks against database servers, file servers, e-mail servers, etc.).

Each of the clients 110 may generate request messages (e.g., HTTP request messages) and send these request messages to the servers 130. In response to receiving the request messages, the servers 130 may send corresponding response messages (e.g., HTTP response messages) to the clients 110. It is possible for one or more of the clients 110 to be compromised and to form a DDoS attack on one or more of the servers 130 and/or the network infrastructure itself.

The scrubbing center 120 may inspect traffic sent between the clients 110 and the servers 130 and "scrub" the traffic (e.g., filter out malicious traffic such as traffic determined to be associated with a DDoS attack) before the traffic is sent towards its destination. In one embodiment, the scrubbing center 120 includes a packet fingerprint profiler component 140, a DDoS detection component 150, and a DDoS mitigation component 160. Each of the components of the scrubbing center 120 may be implemented by one or more electronic/network devices. These components are further described herein below.

The packet fingerprint profiler component 140 determines a set of packet fingerprints seen in actual packets sent between the clients 110 and the servers 130 and profiles this set of packet fingerprints. As used herein, a packet fingerprint is a combination of one or more parameter values that is indicative of a shared characteristic (e.g., same source (e.g., same physical device), same operating system (OS), or same client (e.g., same web browser)). For example, a simple approach may use the source Internet Protocol (IP) address to determine whether packets are from the same source or use the User-Agent field of the HyperText Transfer Protocol (HTTP) header to determine whether packets are from the same client or web browser. As another example, a more sophisticated approach may look at the layout and values of the Transmission Control Protocol (TCP) options in a TCP-SYN packet to determine whether packets are from the same OS. The packet fingerprint profiler component 140 may determine the set of packet fingerprints based on inspecting all of the packets sent between the clients 110 and the servers 130 or based on just inspecting a sample of the traffic (e.g., one out of every forty packets). In one embodiment, the parameters used for packet fingerprinting are predefined and whenever the packet fingerprint profiler component 140 sees a packet it extracts/determines the values corresponding to the predefined parameters for that packet. The packet fingerprint profiler component 140 may then designate each unique combination of values it sees as being a packet fingerprint. For example, if the predefined parameters are OS, OS version, browser, browser version, and IP version, then the packet fingerprint profiler component 140 may extract/determine the values corresponding to these parameters for the packets it sees (e.g., based on inspecting the User-Agent field of the HTTP header and IP header) and designate each unique combination of values as a packet fingerprint. For example, if a packet is determined to be associated with a Windows 7.1 OS and Firefox 5.2 browser using IP version 4 (IPv4), then the packet fingerprint profiler component 140 may designate "Windows, 7.1, Firefox, 5.2, IPv4" as a packet fingerprint. In one embodiment, multiple packet fingerprints can be clustered and be treated as a single packet fingerprint. For example, if the parameters used for packet fingerprinting are parameters PARAM_X, PARAM_Y, and PARAM_Z, and there is a packet fingerprint where PARAM_X=A, PARMA_Y=B, and PARAM_Z=C and another packet fingerprint where PARAM_X=A, PARAM_Y=B, and PARAM_Z=D, but it is determined that both of these packet fingerprints are associated with the same source, client, or OS, then the packet fingerprint profiler component 140 may decide to cluster these packet fingerprints and treat them the same. In one embodiment, the packet fingerprint profiler component 140 clusters packet fingerprints that are associated with the same OS based on the User-Agent headers of HTTP request messages. The packet fingerprint profiler component 140 may use any suitable clustering algorithm to cluster packet fingerprints. In one embodiment, the packet fingerprint profiler component 140 clusters packet fingerprints in a manner that does not care about minor release versions of OS or web browser. For example, continuing with example provided above, the packet fingerprint profiler component 140 may create a more generic (clustered) packet fingerprint such as "Windows, 7.*, Firefox, 5.*, IPv4" (where "*" represents a wild card) that does not care about minor release versions of OS or web browser. In one embodiment, the set of packet fingerprints determined by the packet fingerprint profiler component 140 includes a packet fingerprint that represents unknown packet fingerprints. As used herein, unknown packet fingerprints are packet fingerprints that were not seen enough to establish a valid profile (e.g., a valid risk value)—packet fingerprint profiling is described in further detail below.

In one embodiment, the packet fingerprint profiler component 140 profiles a set of packet fingerprints by assigning risk values to packet fingerprints (e.g., packet fingerprint (PF) risk values 145). In one embodiment, the packet fingerprint profiler component 140 assigns a risk value to a packet fingerprint based on analyzing previous security decisions made for packets having that packet fingerprint. The previous security decision may have been made using any type of security mechanism for identifying malicious and/or legitimate traffic (e.g., SYN cookies, whether the sender of the traffic successfully completed a TCP session with a proxy, inspecting the payload using a set of rules, and looking for packet anomalies). In one embodiment, the previous security decisions include blacklist statistics, whitelist statistics, and/or rate limiting statistics for that packet fingerprint. For example, if the packet fingerprint profiling component 140 determines that a threshold percentage of packets having a given packet fingerprint have been blacklisted and/or rate limited in the past (e.g., by other security mechanisms), then the packet fingerprint profiling component 140 may assign a risk value to that packet fingerprint that is indicative of a relatively high risk of being malicious. As another example, if the packet fingerprint profiling component 140 determines that a threshold percentage of packets having a given packet fingerprint have been whitelisted in the past (e.g., by other security mechanisms), then the packet fingerprint profiling component 140 may assign a risk value to that packet fingerprint that is indicative of a relatively low risk of being malicious.

Additionally or alternatively to assigning risk values, in one embodiment, the packet fingerprint profiler component 140 profiles a set of packet fingerprints by determining a historical traffic characteristic distribution of the set of packet fingerprints (e.g., packet fingerprint (PF) traffic characteristic distribution 147). In one embodiment, the historical traffic characteristic distribution is a historical traffic volume distribution that indicates the distribution of traffic volume across the different packet fingerprints over a period of time (e.g., measured in terms of megabits per second or other bandwidth metric). In one embodiment, the historical traffic characteristic distribution is a historical packet count distribution that indicates the distribution of packet counts across the different packet fingerprints over a period of time (e.g., measured in terms of packets per second or other packet rate metric).

The DDoS detection component 150 detects for the occurrence of potential DDoS attacks. In one embodiment, the DDoS detection component 150 detects the occurrence of a potential DDoS attack based on determining that the current traffic characteristic distribution of a set of packet fingerprints (e.g., the traffic characteristic distribution over a most recent period of time) significantly deviates from the historical traffic characteristic distribution of the set of packet fingerprints (e.g., which may be a traffic characteristic distribution over a longer period of time compared to the current traffic characteristic distribution). For example, assuming that the set of packet fingerprints includes 15 packet fingerprints and the historical traffic volume distribution indicates that each of these packet fingerprint occupies 5 percent of the total traffic and that unknown packet fingerprints occupy the remaining 25 percent of the total traffic, if the DDoS detection component 150 detects that one of the packet fingerprints suddenly occupies 25 percent (a 4× increase) of the total traffic or the unknown packet fingerprints suddenly occupy 30 percent of the total traffic (a 1.2× increase), then the DDoS detection component 150 may determine that a potential DDoS attack is occurring. What is considered a "significant" deviation may be configured differently depending on the specific implementation. Additionally or alternatively, the DDoS detection component 150 may detect the occurrence of a potential DDoS attack using other types of DDoS detection techniques (e.g., based on detecting that the volume of traffic increases above a predefined threshold (where the threshold can be configured manually or dynamically), based on detecting a large volume of traffic originating from a closed set of IP addresses which is only a small subset of the IP addresses in contact with the server, and based on detecting a large volume of traffic containing values/indicators that are known to be associated with malicious traffic).

In one embodiment, the DDoS detection component 150 also determines when the potential DDoS attack has ended. In one embodiment, the DDoS detection component 150 determines that the potential DDoS attack has ended based on determining that the current traffic characteristic distribution of the set of packet fingerprints conforms to the historical traffic characteristic distribution of the set of packet fingerprints (e.g., the current traffic characteristic distribution no longer significantly deviates from the historical traffic characteristic distribution). Additionally or alternatively, the DDoS detection component 150 may determine that the potential DDOS attack has ended using other techniques (e.g., when the volume of traffic returns close to the expected traffic volume).

The DDoS mitigation component 160 may mitigate potential DDoS attacks at the packet fingerprint level. In one embodiment, responsive to the occurrence of a potential DDoS attack (e.g., detected by the DDoS detection component 150), the DDoS mitigation component 160 mitigates the potential DDoS attack by activating a security measure for each of one or more packet fingerprints (e.g., security measures 165) based on the risk value assigned to that packet fingerprint (e.g., the risk value assigned by the packet fingerprint profiling component 140). For example, the DDoS mitigation component 160 may activate a security measure for a given packet fingerprint that blacklists (e.g., blocks packets having the given packet fingerprint) or rate limits the given packet fingerprint (e.g., limit the rate at which packets having the given packet fingerprint can go through to the servers 130) in response to a determination that the risk value assigned to the given fingerprint indicates that the given fingerprint is considered to be malicious (e.g., if the risk value is higher than a predefined threshold value) or unknown. As another example, the DDoS mitigation component 160 may activate a security measure for a given packet fingerprint that whitelists the given packet fingerprint (e.g., allows packets having the given packet fingerprint to go through to the servers 130 even if another security mechanism determines that the packet should be blocked) in response to a determination that the risk value assigned to the given fingerprint indicates that the given packet fingerprint is considered to be legitimate (e.g., if the risk value is lower than a predefined threshold value). While the examples above mention blacklisting, whitelisting, and rate limiting, it should be understood that in some embodiments the DDoS mitigation component 160 can activate other types of security measures (e.g., generating an alert, monitoring/inspecting certain traffic more closely, sending a SYN cookie challenge, conditionally rate limiting (e.g., limit if packet length is longer than 200 bytes), etc.).

Additionally or alternatively, in one embodiment, the DDoS mitigation component 160 activates a security measure for a packet fingerprint based on the historical traffic characteristic distribution of the set of packet fingerprints. For example, the DDoS mitigation component 160 may assign a fixed quota to each of one or more packet fingerprints in the set of packet fingerprints based on the historical traffic characteristic distribution of the set of packet fingerprints (e.g., where the fixed quotas assigned to the packet fingerprints are proportionate to the historical bandwidth usage or historical packet rates for the respective packet fingerprints) and activate a security measure for a packet fingerprint when a traffic volume or packet count associated with that packet fingerprint exceeds the fixed quota assigned to that packet fingerprint. In an embodiment where the DDoS detection component 150 detects the occurrence of a potential DDoS attack based on determining that the current traffic characteristic distribution of a set of packet fingerprints significantly deviates from the historical traffic characteristic distribution of the set of packet fingerprints, the DDoS mitigation component 160 may mitigate the potential DDoS attack by activating a security measure for a packet fingerprint (e.g., blacklisting or rate limiting) in response to a determination that a change in traffic characteristic of that packet fingerprint is responsible or partially responsible for the significant deviation of the current traffic characteristic distribution of the set of packet fingerprints from the historical traffic characteristic distribution of the set of packet fingerprints. In one embodiment, the DDoS mitigation component 160 rate limits the packet fingerprints that are determined to be responsible or partially responsible for the significant deviation more aggressively (rate limit is set to a lower rate) compared to packet fingerprints that are determined not to have a change in traffic characteristic that is responsible for the significant deviation. For example, if a packet fingerprint goes from historically occupying 5 percent of the total traffic volume to suddenly occupying 20 percent of the total traffic volume, this may be deemed as a significant deviation, and the DDoS mitigation component 160 may rate limit this packet fingerprint more aggressively compared to another packet fingerprint that did not have a significant change in the proportion of traffic volume it occupies.

In one embodiment, the DDoS mitigation component 160 deactivates the previously activated security measures in response to a determination that the potential DDoS attack has ended (e.g., based on receiving an indication from the DDoS detection component 150 that the potential DDoS attack has ended.

Embodiments are thus able to mitigate DDoS attacks using packet fingerprinting. An advantage of embodiments disclosed herein is that they dynamically identify packet fingerprints based on actual traffic sent between the clients 110 and the servers 130 and dynamically and adaptively differentiate between malicious and legitimate packet fingerprints (without or with minimal manual effort). Also, embodiments differentiate between malicious and legitimate packet fingerprints in a non-intrusive and passive manner (e.g., no direct interaction with the client is needed—compare this to a SYN cookie challenge which requires direct interaction with the client). Also, by mitigating DDoS attacks at the packet fingerprint level, embodiments may produce less false positives (e.g., compared to a solution that rate limits all traffic when a DDoS attack occurs) and allows for a more predictive false positive rate (e.g., if it is known that a given packet fingerprint occupies 10 percent of the total traffic volume and it is blacklisted, then it is known that the false positive rate will be 10 percent or less).

While the diagram shows that system as including a single scrubbing center 120, in some embodiments the system may include multiple scrubbing centers 120 (e.g., that are geographically dispersed), which are communicatively coupled to the clients 110 and the servers 130, and one or more of the scrubbing centers can perform similar operations as described above to mitigate DDoS attacks using packet fingerprinting.

One or more components of the system may be deployed in a cloud 195 (e.g., a cloud provided by a cloud provider such as Amazon®, Microsoft®, etc.) and/or on premise (e.g., in an enterprise network). In an exemplary arrangement, the scrubbing center 120 is deployed in the cloud 195 while the servers 130 are deployed on-premise, and any request messages originated by the clients 110 that are intended for the servers 130 go through the scrubbing center 120 in the cloud 195 before being sent to the on-premise servers 130. It should be understood that other arrangements are also possible. For example, both the scrubbing center 120 and the servers 130 may be deployed in the cloud 195 or both may be deployed on-premise.

FIG. 2 is a diagram illustrating risk values assigned to packet fingerprints and security measures activated for those packet fingerprints based on the risk values, according to some embodiments. As mentioned above, the packet fingerprint profiler component 140 may determine a set of packet fingerprints and assign risk values to each packet fingerprint in the set of packet fingerprints (e.g., packet fingerprint (PF) risk values 145). In this example, the set of packet fingerprints includes a packet fingerprint where PARAM_X=A, PARAM_Y=B, and PARAM_Z=C (this packet fingerprint is referred to as "PF_ABC"), a packet fingerprint where PARAM_X=D, PARAM_Y=E, and PARAM_Z=F (this packet fingerprint is referred to as "PF_DEF"), a packet fingerprint where 10<PARAM_X<100 OR 110<PARAM_Y<200 (this packet fingerprint is referred to as "PF_X_CLUSTERED"), and unknown packet fingerprints. PF_X_CLUSTERED is a packet fingerprint that represents a cluster of packet fingerprints (i.e., packet fingerprints where PARAM_X is within the defined ranges). The unknown packet fingerprints represent packet fingerprints that were not seen enough to establish a valid risk value. In this example, the packet fingerprint profiler component 140 assigns risk values to packet fingerprints using a numerical scale between 1 and 10, where a value of 1 represents the lowest risk (most likely to be legitimate) and a value of 10 represents the highest risk (most likely to be malicious). In this example, the packet fingerprint profiling component 140 assigns risk values of 5, 2, and 10 to packet fingerprints PF_ABC, PF_DEF, and PF_X_CLUSTERED, respectively. The unknown packet fingerprints are not assigned a risk value.

As mentioned above, in response to the occurrence of a potential DDoS attack, the DDoS mitigation component 160 may mitigate the potential DDoS attack by activating security measures for one or more packet fingerprints based on the risk values assigned to those packet fingerprints (e.g., security measures 165). In this example, since packet fingerprint PF_DEF has been assigned a relatively low risk value, the DDoS mitigation component 160 activates a security measure for packet fingerprint PF_DEF that whitelists that packet fingerprint. In contrast, since packet fingerprint PF_X_CLUSTERED has been assigned a relatively high risk value, the DDoS mitigation component 160 activates a security measure for packet fingerprint PF_X_CLUSTERED that blacklists that packet fingerprint. Packet fingerprint PF_ABC has been assigned a neutral risk value and thus the DDoS mitigation component 160 decides not to activate a security measure for this packet fingerprint. Further, in this example, the DDoS mitigation component 160 applies a security measure to unknown packet fingerprints that rate limits those packet fingerprints.

Figure 3:
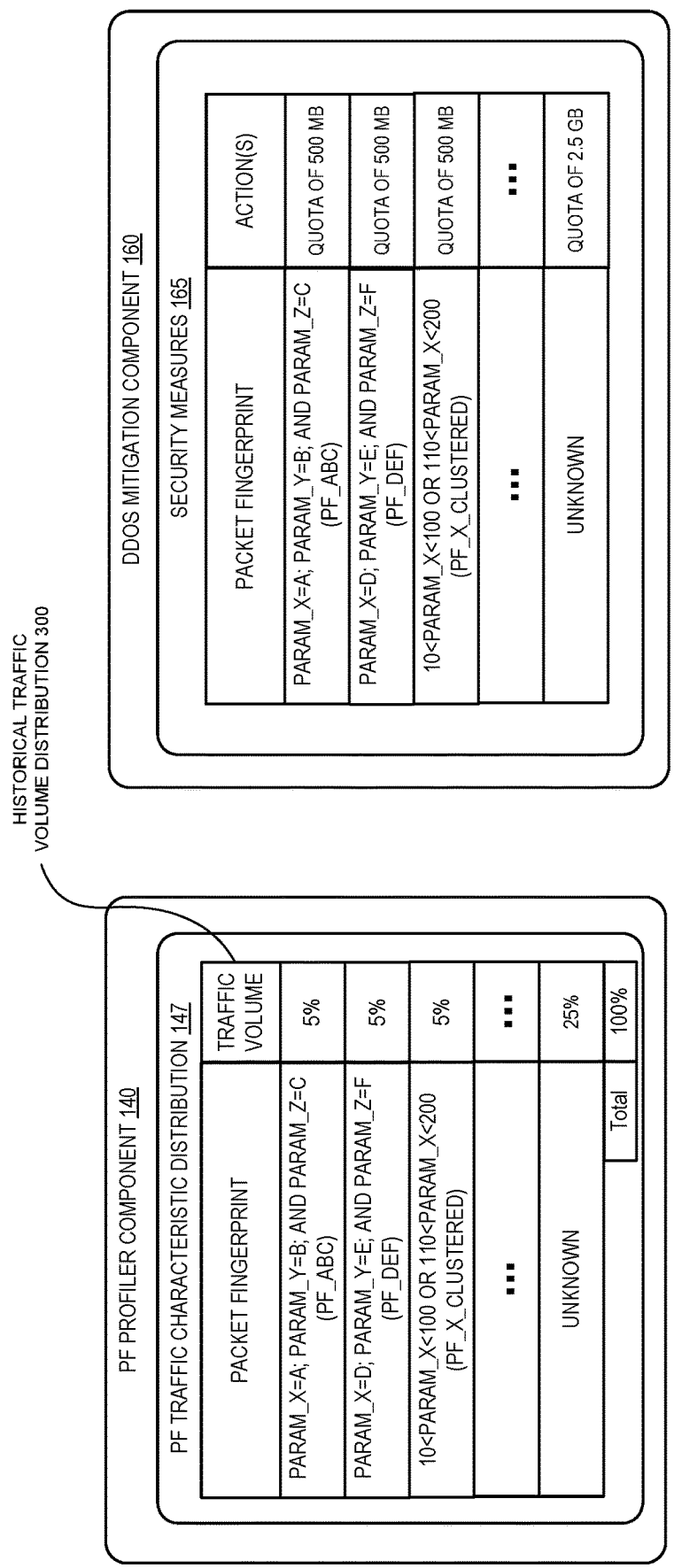
FIG. 3 is a diagram illustrating a historical packet fingerprint traffic volume distribution and fixed quotas assigned to packet fingerprints based on the historical packet fingerprint traffic volume distribution, according to some embodiments.

FIG. 3 is a diagram illustrating a historical packet fingerprint traffic volume distribution and fixed quotas assigned to packet fingerprints based on the historical packet fingerprint traffic volume distribution, according to some embodiments. As mentioned above, the packet fingerprint profiler component 140 may determine a historical traffic volume distribution (or other type of traffic characteristic distribution) for a set of packet fingerprints (e.g., as part of packet fingerprint traffic characteristic distribution 147). In this example, the packet fingerprint profile component 140 has determined a historical traffic volume distribution 300 for the set of packet fingerprints. The historical traffic volume distribution 300 indicates that packet fingerprint PF_ABC typically occupies 5 percent of the total traffic volume, packet fingerprint PF_DEF occupies 5 percent of the total traffic volume, packet fingerprint PF_X_CLUSTERED occupies 5 percent of the total traffic volume, and unknown packet fingerprints occupy 25 percent of the total traffic volume.

As mentioned above, the DDoS mitigation component 160 may assign a fixed quota to each of one or more packet fingerprints based on the historical traffic volume distribution 300. For example, the DDoS mitigation component 160 may assign a quota to each packet fingerprint that is proportionate to the portion of the total traffic that the packet fingerprint occupies. In this example, packet fingerprint PF_ABC is assigned a quota of 500 MB, packet fingerprint PF_DEF is assigned a quota of 500 MB, packet fingerprint PF_X_CLUSTERED is assigned a quota of 500 MB, and unknown packet fingerprints are assigned a quota of 2.5 GB (in this example, the quotas are proportionate to the portion of the total traffic that each packet fingerprint occupies). The DDoS mitigation component 160 may then activate a security measure for a packet fingerprint (e.g., blacklist or rate limit that packet fingerprint) if the volume of traffic associated with that packet fingerprint exceeds the assigned quota.

Figure 4:
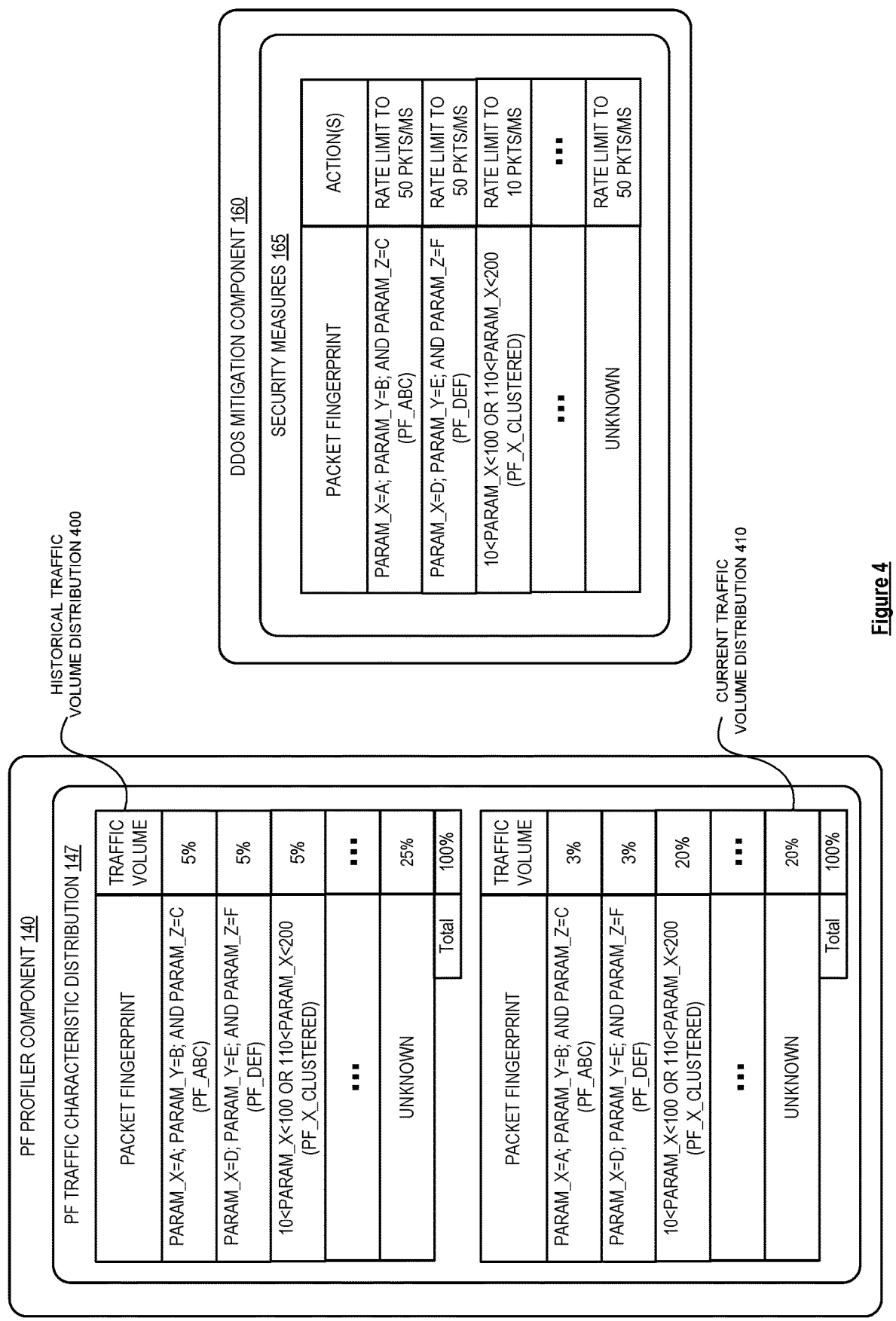
FIG. 4 is a diagram illustrating a historical traffic volume distribution, a current traffic volume distribution, and security measures activated based on those distributions, according to some embodiments.

FIG. 4 is a diagram illustrating a historical traffic volume distribution, a current traffic volume distribution, and security measures activated based on those distributions, according to some embodiments. In one embodiment, the packet fingerprint profiler component 140 determines a historical traffic characteristic distribution for a set of packet fingerprints (e.g., packet fingerprint traffic characteristic distribution 147), which includes a historical traffic volume distribution 400 and a current traffic volume distribution 410 (e.g., the current traffic volume distribution may be the traffic volume distribution over a most recent period of time and the historical traffic volume distribution may be the traffic volume distribution over a longer period of time compared to the current traffic volume distribution). In this example, the historical traffic volume distribution 400 indicates that packet fingerprint PF_ABC occupies 5 percent of the total traffic, packet fingerprint PF_DEF occupies 5 percent of the total traffic, packet fingerprint PF_X_CLUSTERED occupies 5 percent of the total traffic, and unknown packet fingerprints occupy 25 percent of the total traffic. Also, in this example, the current traffic volume distribution 410 indicates that packet fingerprint PF_ABC occupies 3 percent of the total traffic, packet fingerprint PF_DEF occupies 3 percent of the total traffic, packet fingerprint PF_X_CLUSTERED occupies 20 percent of the total traffic, and unknown packet fingerprints occupy 20 percent of the total traffic. Notably, the current traffic volume distribution 410 indicates that the traffic volume of packet fingerprint PF_X_CLUSTERED has increased from occupying 5 percent of the total traffic to occupying 20 percent of the total traffic.

As mentioned above, the DDoS detection component 150 may detect that a potential DDoS attack is occurring based on determining that the current traffic volume distribution 410 significantly deviates from the historical traffic volume distribution 400. In this example, the DDoS detection component 150 may detect that a potential DDoS attack is occurring because the portion of traffic volume occupied by packet fingerprint PF_X_CLUSTERED has increased from 5 percent to 20 percent (which in this example is deemed to be a significant deviation).

As mentioned above, in response to the occurrence of the potential DDoS attack, the DDoS mitigation component 160 may activate security measures for packet fingerprints that are determined to be responsible or partially responsible for the significant deviation of the current traffic volume distribution from the historical traffic volume distribution. In this example, the DDoS mitigation component 160 may determine that PF_X_CLUSTERED is responsible for the significant deviation (since it went from occupying 5 percent of the total traffic volume to occupying 20 percent of the total traffic volume) and thus activate a security measure for PF_X_CLUSTERED that rate limits that packet fingerprint more aggressively compared to a packet fingerprint that is not determined to be responsible for the significant deviation. For example, PF_ABC, PF_DEF, and unknown packet fingerprints are rate limited to 50 packets per millisecond, whereas PF_X_CLUSTERED is rate limited more aggressively to 10 packets per millisecond. Rate limiting the "offending" or "deviating" packet fingerprint more aggressively may help to reduce false positives (compared to a solution that rate limits all traffic equally when a DDoS attack occurs) and also makes the false positive rate more predictable.

Figure 5:
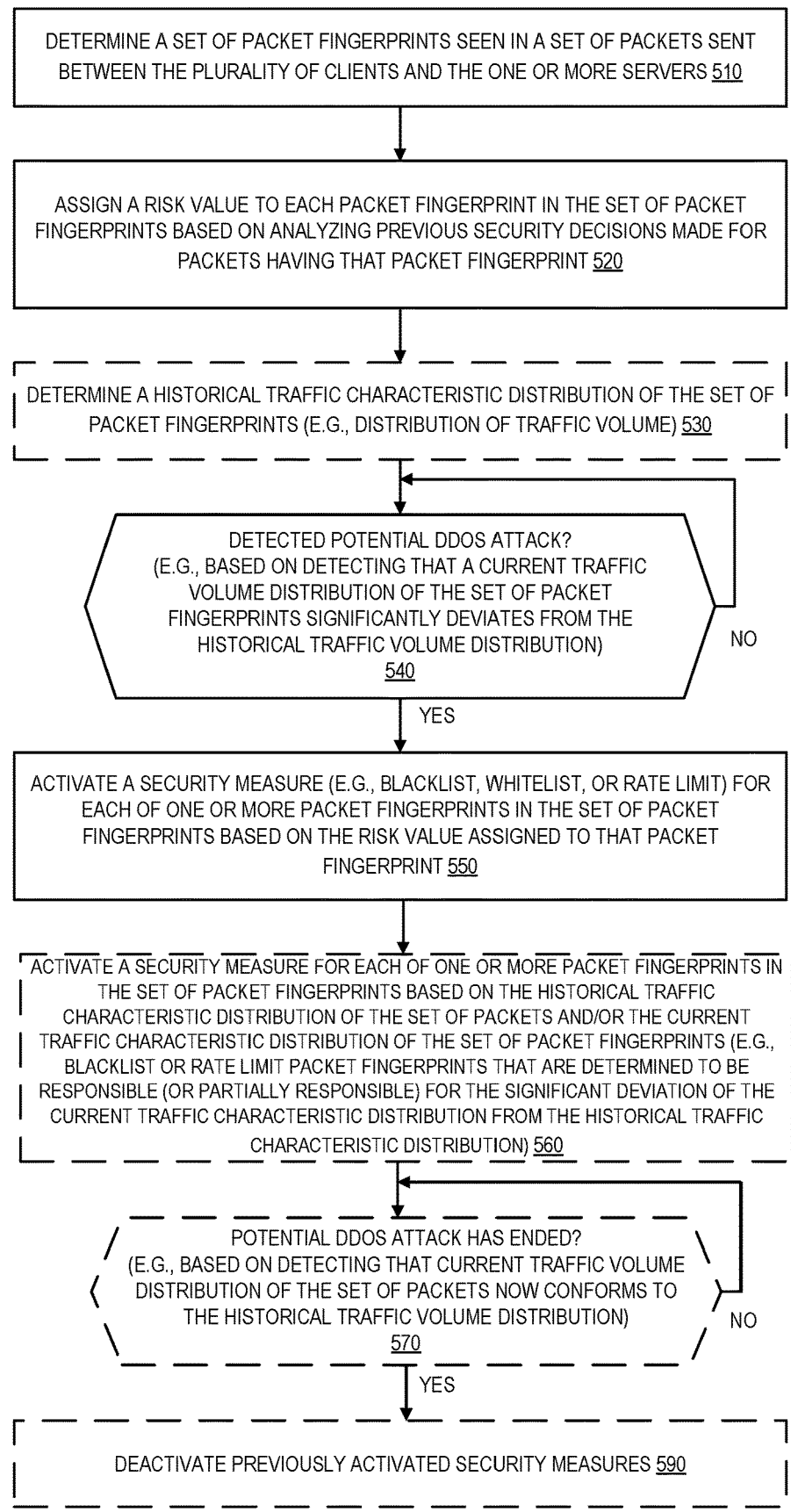
FIG. 5 is a flow diagram of a process for mitigating DDoS attacks using packet fingerprinting, according to some embodiments.

FIG. 5 is a flow diagram of a process for mitigating DDoS attacks, according to some embodiments. In one embodiment, the process is implemented by a scrubbing center (e.g., scrubbing center 120) that is communicatively coupled to a plurality of clients and one or more servers. While the flow diagram is described in a context where the process is implemented by a scrubbing center, it should be understood that the process may be implemented by a different functional entity or a combination of functional entities. The process may be implemented using hardware, software, firmware, or any combination thereof.

At block 510, the scrubbing center determines a set of packet fingerprints seen in a set of packets sent between the plurality of clients and the one or more servers. In one embodiment, at least one packet fingerprint in the set of packet fingerprints represents a cluster of packet fingerprints that are determined to be associated with the same source, client, or operating system. In one embodiment, the set of packet fingerprints includes a packet fingerprint that represents unknown packet fingerprints, where unknown fingerprints are packet fingerprints that were not seen enough to establish a valid risk value.

At block 520, the scrubbing center assigns a risk value to each packet fingerprint in the set of packet fingerprints based on analyzing previous security decisions made for packets having that packet fingerprint. In one embodiment, the previous security decisions made for packets having a given packet fingerprint in the set of packet fingerprints includes blacklist statistics, whitelist statistics, and/or rate limiting statistics for the given packet fingerprint.

In one embodiment, at block 530, the scrubbing center determines a historical traffic characteristic distribution of the set of packet fingerprints. For example, the historical traffic characteristic distribution may be a historical traffic volume distribution or a historic packet count distribution.

At decision block 540, the scrubbing center determines whether the occurrence of a potential DDoS attack has been detected. In one embodiment, the occurrence of the potential distributed denial of service attack is detected based on determining that a current traffic characteristic distribution of the set of packet fingerprints significantly deviates from the historical traffic characteristic distribution of the set of packet fingerprints.

If a potential DDoS attack has not been detected then the scrubbing center continues to detect for the occurrence of potential DDoS attacks. However, if the scrubbing center detects the occurrence of a potential DDoS attack, then at block 550, the scrubbing center activates a security measure for each of one or more packet fingerprints in the set of packet fingerprints based on the risk value assigned to that packet fingerprint. For example, the scrubbing center may activate a security measure for a given packet fingerprint from the one or more packet fingerprints that blacklists or rate limits the given packet fingerprint in response to a determination that the risk value assigned to the given packet fingerprint indicates that the given packet fingerprint is considered to be malicious or unknown. As another example, the scrubbing center may activate a security measure for a given packet fingerprint from the one or more packet fingerprints that whitelists the given packet fingerprint in response to a determination that the risk value assigned to the given packet fingerprint indicates that the given packet fingerprint is considered to be legitimate.

In one embodiment, at block 560, the scrubbing center activates a security measure for each of one or more packet fingerprints in the set of packet fingerprints based on the historical traffic characteristic distribution of the set of packets and/or the current traffic characteristic distribution of the set of packet fingerprints. For example, responsive to detecting the occurrence of the potential distributed denial of service attack, the scrubbing center may assign a fixed quota to each of one or more packet fingerprint in the set of packet fingerprints based on the historical traffic characteristic distribution of the set of packet fingerprints and activate a security measure for a given packet fingerprint when a volume of traffic or packet count associated with the given packet fingerprint exceeds the fixed quota assigned to the given packet fingerprint. In an embodiment where the scrubbing center detects the occurrence of the potential DDoS attack based on determining that the current traffic characteristic distribution of the set of packet fingerprints significantly deviates from the historical traffic characteristic distribution of the set of packet fingerprints, the scrubbing center may activate a security measure for a given packet fingerprint in response to a determination that a change in traffic characteristic of the given packet fingerprint is responsible or partially responsible for the significant deviation. In this embodiment, the security measure for the given packet fingerprint may rate limit the given packet fingerprint more aggressively compared to a packet fingerprint that is determined not to have a change in traffic characteristic that is responsible for the significant deviation.

At decision block 570, the scrubbing center determines whether the potential DDoS attack has ended. In an embodiment where the scrubbing center detects the occurrence of the potential DDoS attack based on determining that the current traffic characteristic distribution of the set of packet fingerprints significantly deviates from the historical traffic characteristic distribution of the set of packet fingerprints, the scrubbing center may determine that the potential DDoS attack has ended based on determining that the current traffic characteristic distribution of the set of packet fingerprints conforms to the historical traffic characteristic distribution of the set of packet fingerprints. If the potential DDoS attack has not ended, then the scrubbing center may continue to apply the previously activated security measures. However, if the scrubbing center determines that the potential DDoS attack has ended, then, at block 590, the scrubbing center may deactivate the previously activated security measures.

Figure 6:
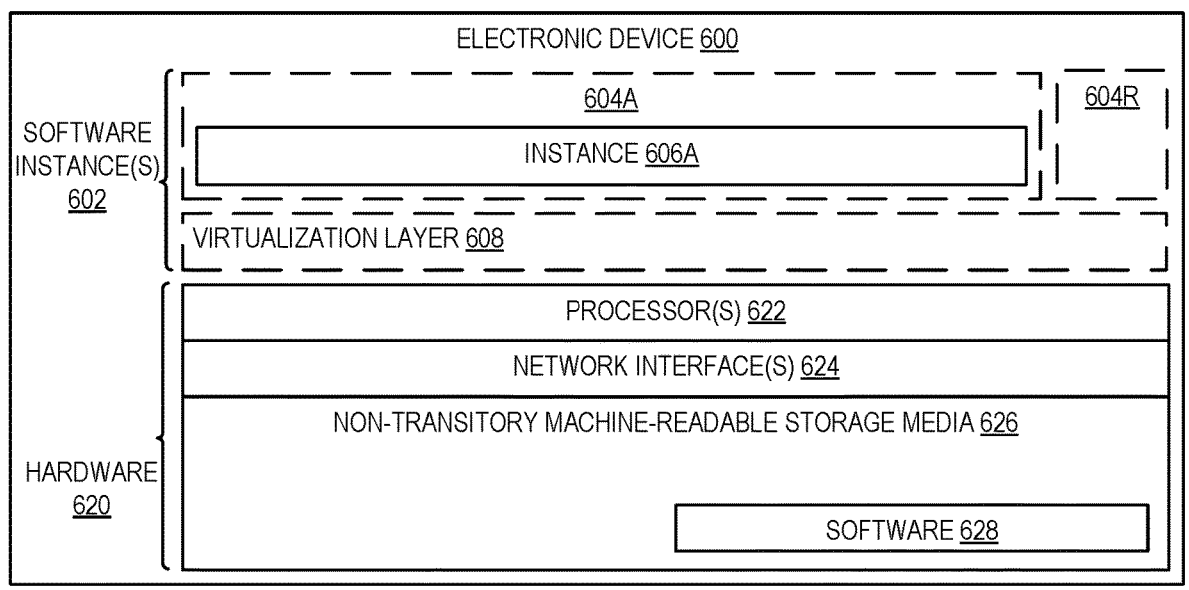
FIG. 6 is a block diagram illustrating an electronic device, according to some embodiments.

FIG. 6 is a block diagram illustrating an electronic device, according to some embodiments. FIG. 6 illustrates hardware 620 comprising a set of one or more processor(s) 622, a set of one or more network interfaces 624 (wireless and/or wired), and non-transitory machine-readable storage media/medium 626 having stored therein software 628 (which includes instructions executable by the set of one or more processor(s) 622). Software 628 can include code, which when executed by hardware 620, causes the electronic device 600 to perform operations of one or more embodiments described herein. Thus, as previously described, the scrubbing center 120, the clients 110, and/or the servers 130 may each be implemented in one or more electronic devices.

In electronic devices that use compute virtualization, the set of one or more processor(s) 622 typically execute software to instantiate a virtualization layer 608 and software container(s) 604A-R (e.g., with operating system-level virtualization, the virtualization layer 608 represents the kernel of an operating system (or a shim executing on a base operating system) that allows for the creation of multiple software containers 604A-R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 628 (illustrated as instance 606A) is executed within the software container 604A on the virtualization layer 608. In electronic devices where compute virtualization is not used, the instance 606A on top of a host operating system is executed on the "bare metal" electronic device 600. The instantiation of the instance 606A, as well as the virtualization layer 608 and software containers 604A-R if implemented, are collectively referred to as software instance(s) 602.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media/medium (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media/medium of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more network devices implementing a scrubbing center for mitigating distributed denial of service attacks, wherein the scrubbing center is communicatively coupled to a plurality of clients and one or more servers, the method comprising:

determining a set of packet fingerprints seen in a set of packets sent between the plurality of clients and the one or more servers;

assigning a risk value to each packet fingerprint in the set of packet fingerprints based on analyzing historical information regarding previous security decisions made for packets having that packet fingerprint, wherein the previous security decisions were made by one or more security mechanisms separate from the scrubbing center that identify malicious traffic based on analyzing traffic seen by the one or more security mechanisms;

determining a historical traffic volume distribution of the set of packet fingerprints over a period of time that is longer than a most recent period of time, wherein the historical traffic volume distribution indicates a distribution of traffic volume across the set of packet fingerprints over the period of time;

detecting an occurrence of a potential distributed denial of service attack based on comparing a current traffic volume distribution of the set of packet fingerprints over the most recent period of time to the historical traffic volume distribution of the set of packet fingerprints over the period of time;

responsive to detecting the occurrence of a potential distributed denial of service attack, activating a security measure for each of one or more packet fingerprints in the set of packet fingerprints based on the risk value assigned to that packet fingerprint; and responsive to detecting the occurrence of the potential distributed denial of service attack, assigning a fixed quota to each of a second one or more packet fingerprints in the set of packet fingerprints based on the historical traffic volume distribution of the set of packet fingerprints and activating a security measure for a given packet fingerprint when a volume of traffic or packet count associated with the given packet fingerprint exceeds the fixed quota assigned to the given packet fingerprint.

2. The method of claim 1, wherein the historical information regarding previous security decisions made for packets having a particular packet fingerprint in the set of packet fingerprints includes blacklist statistics, whitelist statistics, or rate limiting statistics for the particular packet fingerprint.

3. The method of claim 1, wherein the activating a security measure for each of one or more packet fingerprints includes activating a security measure for a second given packet fingerprint from the one or more packet fingerprints that blacklists or rate limits the second given packet fingerprint in response to a determination that the risk value assigned to the second given packet fingerprint indicates that the second given packet fingerprint is considered to be malicious or unknown.

4. The method of claim 1, wherein the activating a security measure for each of one or more packet fingerprints includes activating a security measure for a second given packet fingerprint from the one or more packet fingerprints that whitelists the second given packet fingerprint in response to a determination that the risk value assigned to the second given packet fingerprint indicates that the second given packet fingerprint is considered to be legitimate.

5. The method of claim 1, wherein the occurrence of the potential distributed denial of service attack is detected based on a result of the comparison indicating that the current traffic volume distribution of the set of packet fingerprints significantly deviates from the historical traffic volume distribution of the set of packet fingerprints.

6. The method of claim 5, further comprising:
responsive to detecting the occurrence of the potential distributed denial of service attack, activating a security measure for a second given packet fingerprint in response to a determination that a change in traffic volume of the second given packet fingerprint is responsible or partially responsible for the significant deviation.

7. The method of claim 6, wherein the security measure for the second given packet fingerprint rate limits the second given packet fingerprint more aggressively compared to a packet fingerprint that is determined not to have a change in traffic volume that is responsible for the significant deviation.

8. The method of claim 6, further comprising:
subsequent to activating the security measure for the second given packet fingerprint, deactivating the security measure for the second given packet fingerprint in response to a determination that the current traffic volume distribution of the set of packet fingerprints conforms to the historical traffic volume distribution of the set of packet fingerprints.

9. The method of claim 1, wherein at least one packet fingerprint in the set of packet fingerprints represents a cluster of packet fingerprints that are determined to be associated with the same source, client, or operating system.

10. The method of claim 1, wherein the set of packet fingerprints includes a packet fingerprint that represents unknown packet fingerprints, wherein unknown fingerprints are packet fingerprints that were not seen enough to establish a valid risk value.

11. A set of one or more non-transitory machine-readable storage media storing instructions which, when executed by one or more processors of one or more network devices implementing a scrubbing center that is communicatively coupled to a plurality of clients and one or more servers, causes the one or more network devices to perform operations for mitigating distributed denial of service attacks, the operations comprising:
determining a set of packet fingerprints seen in a set of packets sent between the plurality of clients and the one or more servers;
assigning a risk value to each packet fingerprint in the set of packet fingerprints based on analyzing historical information regarding previous security decisions made for packets having that packet fingerprint, wherein the previous security decisions were made by one or more security mechanisms separate from the scrubbing center that identify malicious traffic based on analyzing traffic seen by the one or more security mechanisms;
determining a historical traffic volume distribution of the set of packet fingerprints over a period of time that is longer than a most recent period of time, wherein the historical traffic volume distribution indicates a distribution of traffic volume across the set of packet fingerprints over the period of time;
detecting an occurrence of a potential distributed denial of service attack based on comparing a current traffic volume distribution of the set of packet fingerprints over the most recent period of time to the historical traffic volume distribution of the set of packet fingerprints over the period of time;
responsive to detecting the occurrence of a potential distributed denial of service attack, activating a security measure for each of one or more packet fingerprints in the set of packet fingerprints based on the risk value assigned to that packet fingerprint; and
responsive to detecting the occurrence of the potential distributed denial of service attack, assigning a fixed quota to each of a second one or more packet fingerprints in the set of packet fingerprints based on the historical traffic volume distribution of the set of packet fingerprints and activating a security measure for a given packet fingerprint when a volume of traffic or packet count associated with the given packet fingerprint exceeds the fixed quota assigned to the given packet fingerprint.

12. The set of one or more non-transitory machine-readable storage media of claim 11, wherein the historical information regarding previous security decisions made for packets having a particular given packet fingerprint in the set of packet fingerprints includes blacklist statistics, whitelist statistics, or rate limiting statistics for the particular packet fingerprint.

13. The set of one or more non-transitory machine-readable storage media of claim 11, wherein the activating a security measure for each of one or more packet fingerprints includes activating a security measure for a second given packet fingerprint from the one or more packet fingerprints that blacklists or rate limits the second given packet fingerprint in response to a determination that the risk value assigned to the second packet fingerprint indicates that the second given packet fingerprint is considered to be malicious or unknown.

14. The set of one or more non-transitory machine-readable storage media of claim 11, wherein the activating a security measure for each of one or more packet fingerprints includes activating a security measure for a second given packet fingerprint from the one or more packet fingerprints that whitelists the second given packet fingerprint in response to a determination that the risk value assigned to the second given packet fingerprint indicates that the second given packet fingerprint is considered to be legitimate.

15. A network device configured to implement a scrubbing center that is to be communicatively coupled to a plurality of clients and one or more servers, wherein the scrubbing center is configured to mitigate distributed denial of service attacks, the network device comprising:
one or more processors; and
a non-transitory machine-readable storage medium having instructions stored therein, which when executed by the one or more processors, causes the network device implementing the scrubbing center to:
determine a set of packet fingerprints seen in a set of packets sent between the plurality of clients and the one or more servers;
assign a risk value to each packet fingerprint in the set of packet fingerprints based on analyzing historical information regarding previous security decisions made for packets having that packet fingerprint, wherein the previous security decisions were made by one or more security mechanisms separate from the scrubbing center that identify malicious traffic based on analyzing traffic seen by the one or more security mechanisms;
determine a historical traffic volume distribution of the set of packet fingerprints over a period of time that is longer than a most recent period of time, wherein the historical traffic volume distribution indicates a distribution of traffic volume across the set of packet fingerprints over the period of time;

detect an occurrence of a potential distributed denial of service attack based on comparing a current traffic volume distribution of the set of packet fingerprints over the most recent period of time to the historical traffic volume distribution of the set of packet fingerprints over the period of time;

responsive to detecting the occurrence of a potential distributed denial of service attack, activate a security measure for each of one or more packet fingerprints in the set of packet fingerprints based on the risk value assigned to that packet fingerprint; and responsive to detecting the occurrence of the potential distributed denial of service attack, assign a fixed quota to each of a second one or more packet fingerprints in the set of packet fingerprints based on the historical traffic volume distribution of the set of packet fingerprints and activate a security measure for a given packet fingerprint when a volume of traffic or packet count associated with the given packet fingerprint exceeds the fixed quota assigned to the given packet fingerprint.

16. The network device of claim 15, wherein the occurrence of the potential distributed denial of service attack is detected based on a result of the comparison indicating a significant deviation of the current traffic volume distribution of the set of packet fingerprints from the historical traffic volume distribution of the set of packet fingerprints.

17. The network device of claim 16, wherein the instructions, when executed by the one or more processors, further cause the network device implementing the scrubbing center to:

responsive to detecting the occurrence of the potential distributed denial of service attack, activate a security measure for a second given packet fingerprint in response to a determination that a change in traffic volume of the second given packet fingerprint is responsible or partially responsible for the significant deviation.

* * * * *